July 17, 1956  G. A LYON  2,755,139
WHEEL COVER
Filed Feb. 2, 1954  2 Sheets-Sheet 1
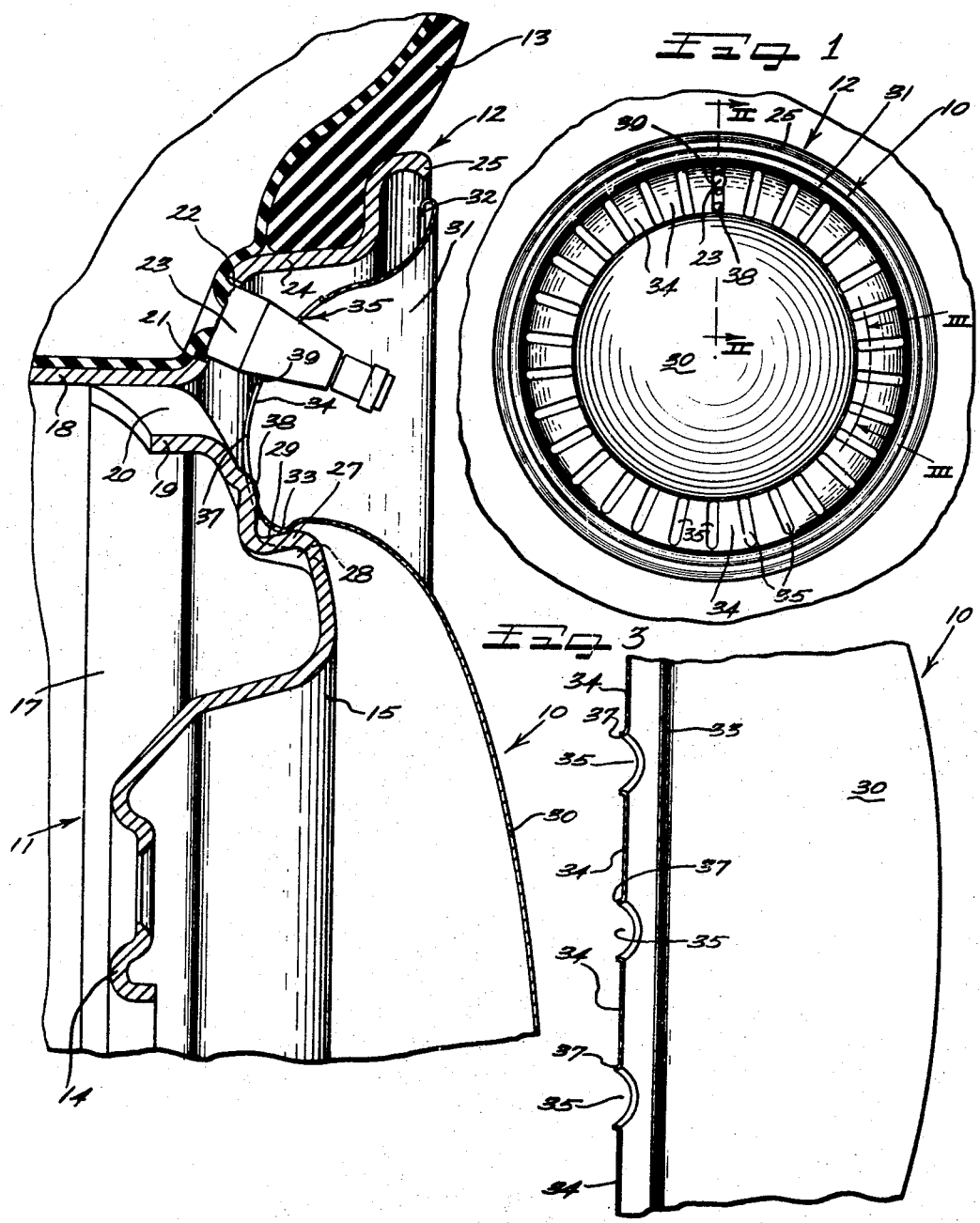
Inventor
George Albert Lyon July 17, 1956 G. A LYON 2,755,139
WHEEL COVER
Filed Feb. 2, 1954 2 Sheets-Sheet 2
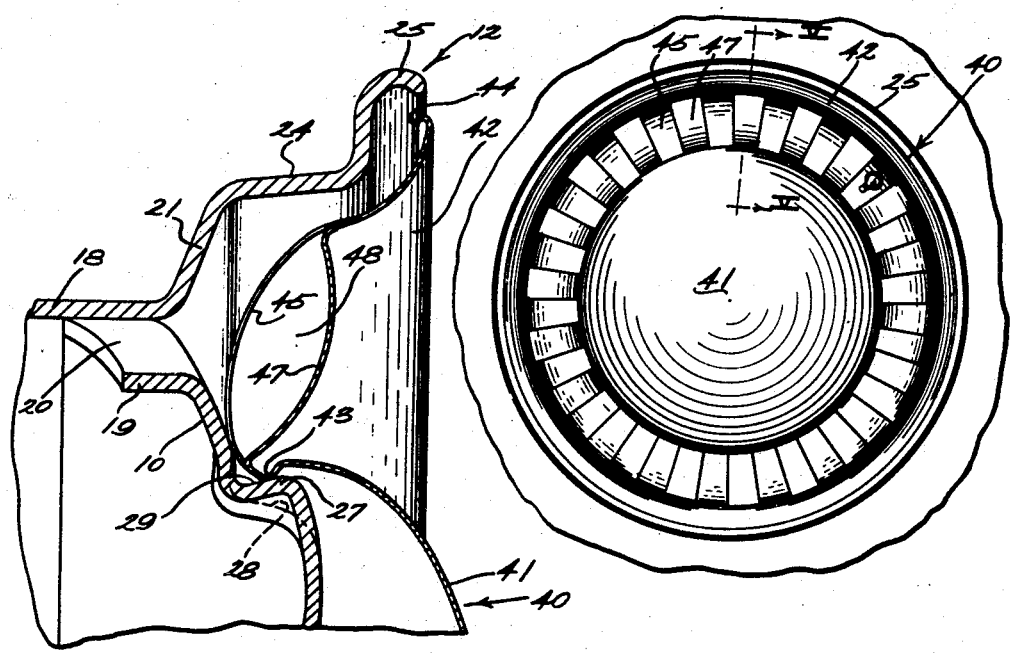
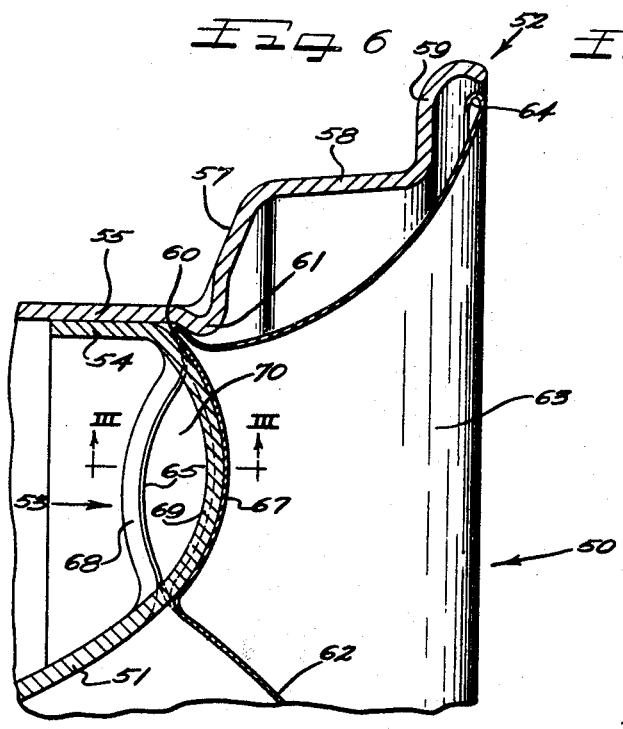
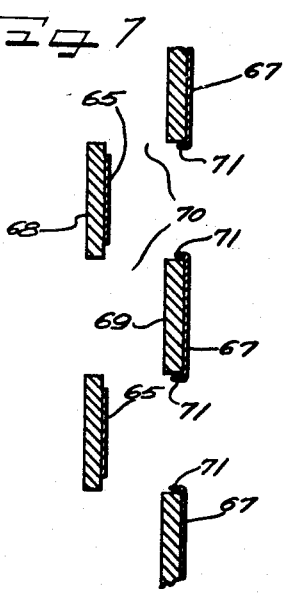
Inventor
George Albert Lyon

United States Patent Office 2,755,139
Patented July 17, 1956

2,755,139
WHEEL COVER
George Albert Lyon, Detroit, Mich.

Application February 2, 1954, Serial No. 407,698

14 Claims. (Cl. 301—37)

The present invention relates to improvements in wheel structures and more particularly concerns the ornamental and protective covering of the outer sides of vehicle wheels in a manner to enable efficient air circulation through the wheel and the cover.

An important object of the present invention is to provide an improved wheel structure including a cover adapted to be applied to the wheel by press-on attachment to cover retaining bumps on the wheel engageable by a resiliently tensioned intermediate portion of the cover.

Another object of the invention is to provide a wheel structure including novel cover means adapted for snap-on, pry-off retaining interengagement with retaining bumps on the wheel and affording improved air circulation openings through the wheel and cover.

A further object of the invention is to provide an improved wheel cover of the stamped disk type adapted for substantially completely concealing a wheel and having means for resiliently tensioned coaction with rigid retaining bumps on the wheel.

Still another object of the invention is to provide a novel wheel cover having annular resiliently tensionable retaining shoulder means intermediately thereof and resilient tensioning spoke-like structure cooperating with the retaining shoulder to improve the resilient tensioning of the shoulder in cooperation with retaining bumps on the wheel.

Other objects, features and advantages of the present invention will be readily apparent from the following detailed description of certain preferred embodiments thereof taken in conjunction with the accompanying drawings in which:

Figure 1 is a side elevational view of a wheel structure embodying features of the invention;

Figure 2 is an enlarged radial sectional view taken substantially on the line II—II of Figure 1;

Figure 3 is an enlarged fragmentary sectional detail view through the cover taken substantially on the line III—III of Figure 1;

Figure 4 is a side elevational view of a modified construction of the wheel structure;

Figure 5 is a fragmentary radial sectional view taken substantially on the line V—V of Figure 4;

Figure 6 is a fragmentary radial sectional view through a further modification; and Figure 7 is a fragmentary transverse radial sectional view through the construction of Figure 6 taken substantially on the line VII—VII.

Having reference to Figures 1 and 2, a wheel cover 10 according to the invention is adapted to be applied in substantially covering relation to the outer side of a vehicle wheel which is preferably of the type disclosed in my prior Patent No. 2,445,330, issued July 20, 1948. The wheel comprises a wheel body 11 of the disk spider type supporting a tire rim 12 of the multi-flanged drop center type supporting a pneumatic tire and tube assembly 13.

The wheel body 11 comprises a dished central bolt-on flange 14 adapted to be secured to the axle hub portion of a vehicle axle by means of the customary attachment bolts or cap screws provided for such purpose. Intermediately the wheel body 11 is provided with an annular generally axially outwardly extending reenforcing nose bulge 15. For attachment of the wheel body 11 to the tire rim, the outer margin of the wheel body is provided with a generally axially inwardly extending marginal flange 17 which is attached in any suitable fashion such as by riveting or welding to a generally axially extending base flange 18 of the tire rim. At suitable intervals such as 3, 4 or 5, the marginal attachment flange 17 is provided with inset flange portions 19 providing air circulation openings 20 through the wheel at the juncture between the wheel body and the tire rim.

From the base flange 18 of the tire rim, extends generally radially outwardly and sloping axially outwardly, a side flange 21 having a valve stem aperture 22 therein for extension therethrough of a valve stem 23 of the tire and tube assembly 13. The side flange 21 merges with a generally axially outwardly and radially outwardly sloping intermediate flange 24 of the tire rim which in turn merges with a radially outwardly and then axially outwardly turned terminal flange 25 of the tire rim.

In my above mentioned prior patent is taught how a hub cap having a resilient turned marginal or edge bead can be attached to a wheel provided with retaining bumps on a radially outwardly facing shoulder on the wheel body, in a highly efficient manner. This has proved to be a highly advantageous commercially important construction. By the present invention, I have provided an arrangement whereby a one-piece full disk cover is adapted to be applied to the wheel where it is equipped with retaining bumps 27 projecting generally radially outwardly from an annular generally radially outwardly facing shoulder 28 at the radially outer side of the nose bulge 15 of the wheel body, with the retaining bumps 27 provided with generally undercut-like generally radially outwardly and axially inwardly directed cover engaging shoulders 29 offset relative to the annular shoulder 28, substantially according to my mentioned prior patent.

For this purpose, the cover 10 comprises a crown portion 30 of a diameter to cover the central portion of the wheel body 11 and the nose bulge 15, and a radially outer annular cover portion 31 extending to a diameter for substantially covering the tire rim 12. The annular portion 31 is of generally dished form to fit complementally into the substantial axially outwardly opening annular groove defined between the tire rim and the wheel body, and the radially outer margin of the cover portion 31 extends adjacent to the tip of the terminal flange 25 and has the edge extremity turned under to provide a reenforcing and finishing bead 32.

For retaining engagement with the retaining bumps 27 on the wheel, the marginal portion of the crown 30 is directed generally axially inwardly to a generally radially inwardly directed annular juncture rib 33 which is of a diameter normally slightly smaller than the outside diameter defined by the retaining shoulders 29 of the retaining bumps on the wheel body. It will be understood that the inturned intermediate jucture rib, bump engaging shoulder 33 may be provided as an inwardly directed fold, that is, it may be directed radially inwardly to a greater extent than shown in Figure 2, or, on the other hand, the retaining shoulder may be formed on a more gradual inwardly directed pitch depending upon particular service requirements.

In order to avoid undue stiffness in the radially inner part of the annular cover portion 31 adjacent to the retaining shoulder rib juncture 33 which might unduly resist radially outward flexure of the retaining rib 33 where it engages the shoulders 29 of the retaining bumps 27, but while nevertheless taking advantage of resiliency improving thrust reaction from the contiguous, integrally united outer annular cover portion to enhance the resilient retaining action of the shoulder 33 on the retaining bumps, the radially inner part of the cover portion 31 is divided along radial lines into a plurality of spoke-like resilient, bowed, strap-like intermediate sections 34, preferably of substantial uniform width providing a symmetrical annular pattern about the crown 30. By providing uniform alternating slots 35 between the several spoke elements 34 a large air circulation passage means is provided in the aggregate opposite the wheel openings 20. Since as best seen in Figure 2, the slots 35 are of substantial radial extent and extend from over the wheel body 11 radially inwardly from the wheel openings 20 to a radially outer position overlying the side flange 21 of the tire rim, and across the wheel openings 20, efficient circulation of air through the cover and through the wheel openings is assured.

For finishing purposes and reenforcement about the slots 35, the margins defining the slots are turned inwardly to provide finishing and reenforcing flanges 37.

The relationship of the inner marginal portion of the cover portion 31 to the adjacent side of the bump engaging shoulder rib 33 is such that when the cover has been pressed home onto the wheel, such radially inner margin bears against the adjacent portion of the wheel body radially inwardly from the wheel openings 20, and thereby maintains the radially outer margin of the annular cover portion 31 in spaced relation to the tire rim as seen in Figure 2, whereby wheel balancing weights are readily accommodated therebehind and gravel and dirt can readily escape from behind the cover. In addition, air circulation is enabled through the gap thereby provided between the radially outer margin on the cover and the tire rim.

In order to retain the cover 10 against turning relative to the wheel, especially to prevent distortion of the valve stem 23 which extends through one of the slots 35, means are preferably provided on the wheel body to engage within one of the slots to hold the cover against turning. To this end, the wheel body is preferably embossed in the portion thereof radially outwardly from the wheel body shoulder 28 to provide a retaining lug or node 38 projecting generally axially outwardly to engage in one of the slots 35 and preferably the radially inner portion of the same slot 35 through which the valve stem 23 engages. In making the wheel, the anti-turn projection 38 is lined up with the valve stem aperture 22 for this purpose. It will be observed that the slot 35 through which the valve stem 23 extends is slightly enlarged in the radially outer portion thereof as shown at 39 to accommodate the valve stem.

To apply the cover 10, it is centered relative to the wheel and the crown portion 30 pressed axially inwardly to snap the retaining shoulder rib 33 over and into retaining engagement with the bumps 27. This draws the adjacent portion of the cover portion 31 snugly against the contiguous portion of the wheel body. For removing the cover, a pry-off tool is applied behind the radially outer portion of the cover and is then worked by progressive pry-off force in behind the retaining shoulder rib 33 to pry the cover free from the wheel.

In the modification shown in Figures 4 and 5, substantially the same structure is incorporated therein but the spoke-like portion of the outer annular cover section is somewhat different. Since the wheel itself is identical with the wheel shown in Figure 2, similar reference numerals have been applied to designate identical parts. Applied to the outer side of the wheel is a cover 40 having a crown 41 and a radially outer annular cover portion 42 carried integrally in one piece by the crown 41 and adapted to overlie the tire rim. Juncture of the crown portion 41 and the radially outer portion 42 of the cover is on a generally radially inwardly directed annular indented retaining shoulder rib 43 which is engageable in snap-on, pry-off relation with the shoulders 29 of the retaining bumps 27. At its radially outer margin, the cover portion 42 is turned under to provide a reenforcing and finishing bead 44.

For relieving the resistance of the cover portion 42 to radial resilient deflection of the retaining shoulder rib 43 in coaction with the retaining bumps 27, the cover portion 42 is intermediately provided with a uniform series of alternately axially inwardly bowed and axially outwardly bowed respective radially extending spoke-like strip or strap portions 45 and 47. The resilient spoke-like connecting portions 45 and 47 are separated along their longitudinal edges by simple severance of the material of the cover portion 42 and they are, of course, integrally joined in one piece at their radially inner ends adjacent to the radially outer side of the retaining rib 43 while at their radially outer ends they are connected to the continuous annular radially outer marginal part of the annular cover portion 42. By virtue of their bowed construction, the spoke-like slats or strips are readily deflectable by radial contraction but will react with resilient radial thrust toward the shoulder 43 when the latter is stretched radially outwardly elastically in working over the bumps 27.

Air circulation through the cover is greatly facilitated by virtue of the large circumferentially directed openings 48 between the adjacent edges of the slats or spoke strips 45 and 47. Such openings 48 while of large air circulation area are virtually completely hidden from the face of the cover unless one looks from a sharp angle to the face of the cover.

In the modification shown in Figures 6 and 7, some modification of the wheel is present. In this wheel, a cover 50 is applied to the outer side of a wheel comprising a body 51 and a tire rim 52. The wheel body has a generally axially outwardly directed annular bulge portion 53 which is provided with a continuous axially inwardly directed marginal flange 54 attached in suitable manner to a base flange 55 of the tire rim merging with a side flange 57 which in turn merges with an intermediate flange 58 adjoining a terminal flange 59.

Attachment of the cover 50 to the wheel is effected by engagement of a continuous annular attachment rib 60 on the cover formed intermediately on the cover 50 with retaining bumps 61 provided on the axially outer side of the base flange 55 adjacent to juncture with the wheel body and preferably formed at juncture of the base flange 55 with the side flange 57. To this end, the cover 50 comprises a crown portion 62 and a radially outer annular portion 63 which extends into concealing relation to the tire rim and has an underturned reenforcing and finishing bead 64 adapted to lie adjacent the terminal flange 59 in spaced relation in full assembly of the cover on the wheel, substantially as shown in Figure 6. The annular cover portion 63 extends generally radially and axially inwardly to juncture with the radially outer side of the crown portion 62 and at the juncture the retaining shoulder 60 is provided as a generally radially outwardly and axially inwardly directed open fold-like rib.

In order to afford relief for radially inward deflection of the resilient retaining rib shoulder 60, the portion of the crown 62 radially inwardly from the retaining rib is slotted along radial lines to provide alternate axially inwardly bowed and axially outwardly bowed respective spoke-like strips 65 and 67. In the present instance, the spoke-like strips 65 and 67 are formed substantially complementary to corresponding axially inwardly and axially outwardly bowed spoke-like strips 68 and 69, respectively, on the axially outwardly bulged portion 53 providing therebetween substantial generally circumferentially opening air circulation openings 70 for the wheel. In assembly, the spoke-like portions 65 lie against the spoke-like portions 68 of the wheel while the spoke-like portions 67 of the cover lie against the spoke-like portions 69 of the wheel and cover the same. For reenforcing and finishing purposes, the cover spoke portions 67 are provided with axially inturned longitudinal marginal flanges 71 which lie at the side edges of the spoke-like portions 69 of the wheel. The flanges 71 also assist in retaining the cover against turning on the wheel by interengagement with the sides of the spoke portions 69.

It will be understood that modifications and variations may be effected without departing from the scope of the novel concepts of the present invention.

I claim as my invention:

1. In a wheel structure including a tire rim member and a wheel body member supporting the tire rim member, one of said members having cover engaging generally radially projecting bumps thereon, a cover for the outer side of the wheel comprising a plate structure for substantially covering the wheel and having an intermediate annular resiliently deflectable bump engaging rib directed generally radially for retaining snap-on, pry-off engagement with said bumps, the cover having a portion thereof extending substantially radially beyond said rib in the opposite direction from said bumps and said portion being subdivided into a plurality of generally radially extending spoke-like elements resiliently deflectable upon radial deflection of said rib in working over said bumps for relieving said radial deflection of the rib but exerting radial resilient tensioning thrust toward said rib.

2. In a wheel structure including a tire rim member and a wheel body member supporting the tire rim member, one of said members having cover engaging generally radially projecting bumps thereon, a cover for the outer side of the wheel comprising a plate structure for substantially covering the wheel and having an intermediate annular resiliently deflectable bump engaging rib directed generally radially for retaining snap-on, pry-off engagement with said bumps, the cover having a portion thereof extending substantially radially beyond said rib in the opposite direction from said bumps and said portion being subdivided into a plurality of generally radially extending spoke-like elements resiliently deflectable upon radial deflection of said rib in working over said bumps for relieving said radial deflection of the rib but exerting radial resilient tensioning thrust toward said rib, said spoke-like elements being spaced substantially apart to afford air circulation gaps therebetween.

3. In a wheel structure including a tire rim member and a wheel body member supporting the tire rim member, one of said members having cover engaging generally radially projecting bumps thereon, a cover for the outer side of the wheel comprising a plate structure for substantially covering the wheel and having an intermediate annular resiliently deflectable bump engaging rib directed generally radially for retaining snap-on, pry-off engagement with said bumps, the cover having a portion thereof extending substantially radially beyond said rib in the opposite direction from said bumps and said portion being subdivided into a plurality of generally radially extending spoke-like elements resiliently deflectable upon radial deflection of said rib in working over said bumps for relieving said radial deflection of the rib but exerting radial resilient tensioning thrust toward said rib, said spoke-like elements being separated by substantial slots affording air circulation therethrough and having reenforcing flanges turned inwardly thereabout.

4. In a wheel structure including a tire rim member and a wheel body member supporting the tire rim member, one of said members having cover engaging generally radially projecting bumps thereon, a cover for the outer side of the wheel comprising a plate structure for substantially covering the wheel and having an intermediate annular resiliently deflectable bump engaging rib directed generally radially for retaining snap-on, pry-off engagement with said bumps, the cover having a portion thereof extending substantially radially beyond said rib in the opposite direction from said bumps and said portion being subdivided into a plurality of generally radially extending spoke-like elements resiliently deflectable upon radial deflection of said rib in working over said bumps for relieving said radial deflection of the rib but exerting radial resilient tensioning thrust toward said rib, said spoke-like elements being alternately bowed generally axially inwardly and generally axially outwardly.

5. In a wheel structure including a tire rim member and a wheel body member supporting the tire rim member, one of said members having cover engaging generally radially projecting bumps thereon, a cover for the outer side of the wheel comprising a plate structure for substantially covering the wheel and having an intermediate annular resiliently deflectable bump engaging rib directed generally radially for retaining snap-on, pry-off engagement with said bumps, the cover having a portion thereof extending substantially radially beyond said rib in the opposite direction from said bumps and said portion being subdivided into a plurality of generally radially extending spoke-like elements resiliently deflectable upon radial deflection of said rib in working over said bumps for relieving said radial deflection of the rib but exerting radial resilient tensioning thrust toward said rib, said spoke-like elements being bowed to enhance the resiliency thereof.

6. In a wheel structure including a tire rim member and a wheel body member supporting the tire rim member, one of said members having cover engaging generally radially projecting bumps thereon, a cover for the outer side of the wheel comprising a plate structure for substantially covering the wheel and having an intermediate annular resiliently deflectable bump engaging rib directed generally radially for retaining snap-on, pry-off engagement with said bumps, the cover having a portion thereof extending substantially radially beyond said rib in the opposite direction from said bumps and said portion being subdivided into a plurality of generally radially extending spoke-like elements resiliently deflectable upon radial deflection of said rib in working over said bumps for relieving said radial deflection of the rib but exerting radial resilient tensioning thrust toward said rib, one of said members having a projection thereon extending between a pair of adjacent ones of said spoke-like elements to retain the cover against turning on the wheel.

7. In a wheel structure including a tire rim and a wheel body having a nose bulge thereon provided with generally radially outwardly extending cover retaining bumps, a cover for the outer side of the wheel comprising a one-piece sheet metal disk of a diameter to substantially cover the entire wheel including the tire rim, said cover disk having an intermediate generally inwardly directed annular cover retaining shoulder rib engageable in snap-on, pry-off relation with said bumps, said cover disk having a series of generally radially extending spoke-like elements integrally connected at their respective opposite ends by the adjacent side of said rib and a continuous annular portion of the cover and affording resilience in the cover adjacent said rib to relieve resilient tensioning deflection of the rib in press-on, pry-off action relative to said bumps.

8. In a wheel structure including a tire rim and a wheel body supporting the tire rim and having wheel openings at juncture of the tire rim and wheel body, the wheel body having an annular generally axially outwardly extending bulge provided with generally radially outwardly extending cover retaining bumps, a cover for the outer side of the wheel comprising a central portion and an annular radially outer portion, said portions having at juncture thereof an annular generally radially inwardly directed shoulder rib engageable in snap-on, pry-off relation with said bumps, said radially outer portion of the cover having a plurality of spoke-like radial portions affording openings therebetween cooperating with said wheel openings for air circulation and providing a radially outward resilient area on the cover adjacent to the radially outer side of said rib to enable resilient flexible deflection of the rib in working over said bumps.

9. In a wheel structure including a tire rim and a wheel body supporting the tire rim and having wheel openings at juncture of the tire rim and wheel body, the wheel body having an annular generally axially outwardly extending bulge provided with generally radially outwardly extending cover retaining bumps, a cover for the outer side of the wheel comprising a central portion and an annular radially outer portion, said portions having at juncture thereof an annular generally radially inwardly directed shoulder rib engageable in snap-on, pry-off relation with said bumps, said radially outer portion of the cover having a plurality of spoke-like radial portions affording openings therebetween cooperating with said wheel openings for air circulation and providing a radially outward resilient area on the cover adjacent to the radially outer side of said rib to enable resilient flexible deflection of the rib in working over said bumps, said wheel body having adjacent the radially outer side of the bumps a projection engageable between a pair of said spoke-like elements to hold the cover against turning.

10. In a wheel structure including a tire rim and a wheel body, the wheel body being attached to the inner periphery of the tire rim and having a plurality of spoke-like inwardly and outwardly bowed alternating elements adjacent juncture with the tire rim and affording air circulation openings through the wheel body, a cover for the outer side of the wheel including a radially outer portion for covering the tire rim and a radially inner portion for covering the wheel body, said radially inner portion having spoke-like separated inwardly and outwardly bowed elements generally complementary to and overlying the spoke-like elements of the wheel body and affording openings through the cover corresponding to the openings through the wheel body, the cover having radially outwardly from the spoke-like elements an annular generally radially outwardly extending cover retaining rib, and the tire rim having cover retaining bumps thereon engageable by said rib for retaining the cover on the wheel in snap-on, pry-off relation.

11. In a wheel structure including a tire rim and a wheel body, the wheel body being attached to the inner periphery of the tire rim and having a plurality of spoke-like inwardly and outwardly bowed alternating elements adjacent juncture with the tire rim and affording air circulation openings through the wheel body, a cover for the outer side of the wheel including a radially outer portion for covering the tire rim and a radially inner portion for covering the wheel body, said radially inner portion having spoke-like separated inwardly and outwardly bowed elements generally complementary to and overlying the spoke-like elements of the wheel body and affording openings through the cover corresponding to the openings through the wheel body, the cover having radially outwardly from the spoke-like elements an annular generally radially outwardly extending cover retaining rib, and the tire rim having cover retaining bumps thereon engageable by said rib for retaining the cover on the wheel in snap-on, pry-off relation, certain of the spoke-like elements on the cover having generally axially inwardly extending flanges engageable at the sides of the underlying spoke-like elements of the wheel body for retaining the cover against turning.

12. A cover for disposition at the outer side of a wheel having cover retaining bumps thereon, comprising a disk having an intermediate annular bump engaging rib shoulder, the cover having an annular area adjacent to said rib separated along lines directed away from said rib into a plurality of resilient spoke-like elements, said spoke-like elements being alternately bowed generally axially inwardly and generally axially outwardly.

13. In a wheel structure, a cover for disposition at the outer side of the wheel and including a cover body having a series of generally radially extending elongated longitudinally resilient spoke-like elements, and wheel engaging retaining means on the cover radially deflectably engageable with a cooperating portion of the wheel and toward which retaining means said spoke-like elements thrust resiliently to enhance the cover retaining engagement of said means with the wheel, said retaining means comprising an annular resilient rib into which the contiguous ends of the spoke-like elements merge.

14. In a cover for disposition at the outer side of a vehicle wheel, an inner crown cover portion having a generally axially inwardly extending side wall flange, a radially outer cover portion radially spaced from said wall flange, connecting spokes between said cover portions, the axially inner end portion of said wall having a generally radially inwardly directed annular cover-retaining shoulder rib engageable with retaining bumps on a wheel, said shoulder rib having at the axially inner side thereof a generally radially outwardly directed narrow flange with the radially inner ends of the connecting spoke elements extending therefrom.

References Cited in the file of this patent
UNITED STATES PATENTS

| | | |
|---|---|---|
| 2,020,885 | Gatta | Nov. 12, 1935 |
| 2,199,888 | Lyon | May 7, 1940 |
| 2,491,505 | Lyon | Dec. 20, 1949 |